UNITED STATES PATENT OFFICE.

THOMAS STERRY HUNT, OF MONTREAL, CANADA EAST.

IMPROVEMENT IN COMPOSITIONS FOR BANK-NOTE AND OTHER INKS.

Specification forming part of Letters Patent No. 40,839, dated December 8, 1863.

*To all whom it may concern:*

Be it known that I, THOMAS STERRY HUNT, a resident of Montreal, Canada East, have invented a new and useful improvement in the composition of ink, suitable for printing and coloring or shading bank-notes and other instruments and documents by the copper-plate, lithographic, typographic, xylographic, or other processes of printing; and I do hereby declare that the following is a full, true, and exact description of my said invention and improvement, and of the manner of preparing and using the same.

My invention and improvement consist in the new manufacture of ink produced by the application and use for the basis and coloring-ingredient of the ink of a compound of stannic acid (peroxide of tin) with a small proportion of oxide of chromium, forming what has been called "mineral lake."

I also claim as my invention and improvement the use of modifications of this color, and all similar compounds produced by the partial or complete replacement of the oxide of chromium in the compound of stannic acid by one or more of the following oxides, viz: oxides of gold, uranium, copper, lead, cobalt, nickel, iron, manganese, and cerium, and, finally, the use of all colored compounds of stannic acid with a metallic oxide. I prepare these colors by various methods, one of the best of which is to oxidize metallic tin with nitric acid, and then to impregnate the washed peroxide of tin thus obtained with a solution of the chromium or other metal in the state of nitrate, and afterward to calcine the mixture. Another method is to oxidize metallic tin by nitric acid holding in solution the chromium or other metal. I prefer to use from three to five hundredths of the weight of the tin in bichromate of potash. From this results a greenish compound of stannic acid (or peroxide of tin) with chromium, which is to be washed, dried, and heated to redness, or calcined, as before, when the mineral lake is obtained in lumps or granular masses of a fine purple color, which is triturated, or otherwise reduced to a fine powder. For making and converting this powder into ink for printing by any of the printing processes above mentioned, it is ground or triturated by the ordinary methods with a sufficient quantity of burned or boiled linseed-oil, or "printer's varnish," as it is sometimes called, in the manner customary for preparing printers' inks for the purposes of printing, already mentioned. The ink is then spread or placed upon the steel, copper, or other plates or types used for printing in the method usual with printers in printing by the processes above named, respectively.

The ink thus made and prepared from the calcined compounds of peroxide of tin above described, when printed upon bank-note paper, or other paper commonly used in printing, is not changed by air or light, and cannot be removed from the paper by any dissolvents or by any means except such as will remove from the paper the ordinary black printer's ink, so that when this new metallic ink is used in connection with the ordinary black printing-ink, it presents a great security against alteration and counterfeiting by photography or by any other known process.

I do not claim as my invention and improvement the discovery or invention of the mineral compounds or colors above described, nor the particular methods above mentioned for preparing the same; but

What I claim as my invention and improvement in the foregoing, and for which I desire Letters Patent, is—

The new use and application of the said mineral compounds, as an ingredient or basis of an ink for printing from engraved plates, from types, or for other kinds of printing.

THOMAS STERRY HUNT.

Witnesses:
J. B. STAPLES,
HENRY WILLIAMS.